Patented Aug. 19, 1924.

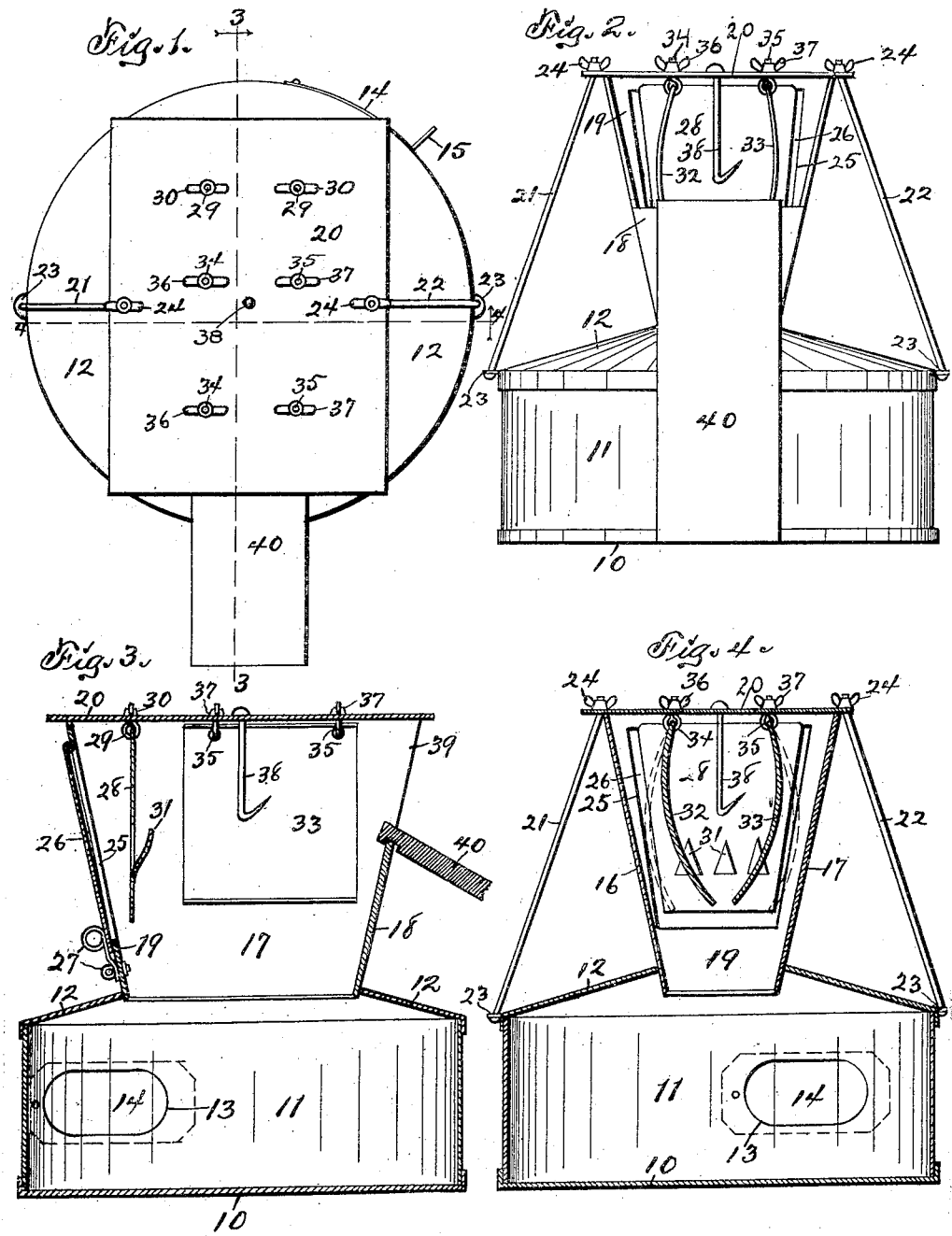

1,505,932

UNITED STATES PATENT OFFICE.

HENRY BUTTRAM, OF MORAN, IOWA.

TRAP.

Application filed September 15, 1922. Serial No. 588,361.

*To all whom it may concern:*

Be it known that I, HENRY BUTTRAM, a citizen of the United States of America, and resident of Moran, Dallas County, Iowa, have invented a new and useful Trap, of which the following is a specification.

An object of this invention is to provide an improved construction for an animal trap having convenient and tempting means of ingress, convenient bait-carrying means and precautions against the escape of a trapped animal.

A further object of this invention is to provide improved means for manual inspection and adjustment of the trap members.

A further object of this invention is to provide improved means for housing captive animals for transportation and disposition.

My invention consists in the construction, arrangement and combination of elements hereinafter set forth, pointed out in the claim and illustrated by the accompanying drawing, in which—

Figure 1 is a plan of the complete device in position for practical use. Figure 2 is a front elevation of the same. Figure 3 is a longitudinal vertical section of the device on the indicated line 3—3 of Figure 1. Figure 4 is a vertical cross-section of the device on the indicated line 4—4 of Figure 1.

In the construction of the device as shown the numeral 10 designates a bottom, 11 a side wall and 12 an arched or dome-shaped top, which are rigidly connected and constitute a housing or chamber. A doorway 13 is formed in the wall 11 and normally is closed by a door 14 pivoted at one end to the wall provided with a handle 15 for convenient manipulation thereof. A rectangular opening is formed in the top 12 and a cupola is mounted therein and rises therefrom and is fixed thereto. The cupola is formed of side walls 16, 17 and end walls 18, 19 of slightly greater width at their upper ends than at their lower ends, and said walls are secured together and have their lower ends extended through and fixed to the top 12. The cupola, therefore, tapers slightly from top to bottom and is open at its lower end in communication with the housing or chamber. A cover 20 is mounted on the cupola and projects over the upper ends of the walls thereof on all sides. Rods 21, 22 extend through apertured ears 23 on the top 12 and through marginal portions of the cover 20 and are secured by wing-nuts 24 on their upper ends, thereby further connecting the cover, walls and top in order that the complete device may readily be transported and handled and held in assembled relation. A doorway 25 is formed in the end wall 19 of the cupola and a door 26 is hinged at its upper end to said wall and extends normally across said doorway, said door being provided with a suitable latch 27 at its lower end forming a further connection thereof to the wall. A bait-hanger 28 is suspended within the cupola, adjacent to the end wall 19, on eye-bolts 29 extending through the cover 20 and secured by wing-nuts 30 above said cover. Prongs or hooks 31 are formed by striking out portions of the hanger 28 and bait of suitable character may be suspended thereon on the side thereof furthest from the wall 19. It is the function of the hanger 28 to suspend bait out of reach of an animal for the purpose of tempting said animal to jump for said bait and be precipitated into the housing 11. It is suspended from the top of the cupola and hinged to provide an unstable support for the animal, in the event it is reached, and contribute to the fall of the animal. False walls 32, 33, preferably made of sheet metal in concaved form, are suspended within the cupola, substantially at right angles to and spaced from the hanger 28, on eye-bolts 34, 35 extending through the cover 20 and secured thereto by wing-nuts 36, 37 above said cover. The false walls 32, 33 are spaced apart and are arranged with their concaved faces toward each other. They also are spaced from the side walls 16, 17 of the cupola and hang freely, and a bait hook 38 is mounted through and depends from the cover 20 between them and substantially centrally of the device. An entrance doorway 39 is formed in the front wall 18 of the cupola and the lower margin of said doorway is substantially centrally of said wall. A gang member or approach 40 is detachably secured to the end wall 18, extends slightly through the doorway 39 and rests at its outer end on the floor or surface supporting the trap.

In practical use the hanger 28 and hook 38 are provided with bait attractive to the animals to be captured, such as rats, and the trap is placed in convenient position to be observed and approached by them. If desired, either one of the bait hangers 28, 38 may be used selectively, but it is desirable to use them both, the one to supplement the other, and different kinds of bait may be provided for the two. For instance, on the hanger 28 may be placed a bait which will appeal to the sense of smell of the animal, while on the hook 38 may be placed a bait which will appeal to his sense of sight as he mounts the gang member 40. The gang member 40 is placed in position to give the animals convenient access to the doorway 39, which they approach in search of the bait. The animals jump from the upper end of the gang member toward the bait and ultimately are precipitated between the false walls 32, 33 into the housing, said walls deceiving them by their location and form by presenting an appearance of security and stability. After being precipitated to the bottom 10 of the trap, the animals are unable to make their escape from the housing unaided and are confined therein until manually removed. The animals may be killed in the housing in any suitable manner. The major parts of the trap may be disconnected and separated by removing the rods 21, 22.

I claim as my invention—

A trap comprising a cylindrical housing having a door and formed with a dome-shaped top having an opening therein, a downwardly tapering cupola superposed on said top and having an open lower end portion extending through said top and communicating with said opening; said cupola being formed with an entrance opening vertically spaced from said top and also being formed with a door opposite to said entrance opening, a bait hanger suspended within and from the top of said cupola adjacent to said last-named door, false walls suspended within and from the top of said cupola substantially at right angles to said last-named door and an approach to said entrance opening.

Signed at Des Moines, in the county of Polk and State of Iowa, this 16th day of August, 1922.

HENRY BUTTRAM.